United States Patent [19]

Sakowski et al.

[11] Patent Number: 4,468,377
[45] Date of Patent: Aug. 28, 1984

[54] CONTINUOUS PROCESS FOR THE MANUFACTURE OF CALCIUM HYPOCHLORITE

[75] Inventors: Walter J. Sakowski, Cleveland; Manohar C. Bajaj, Chattanooga; Budd L. Duncan, Athens, all of Tenn.

[73] Assignee: Olin Corporation, New Haven, Conn.

[21] Appl. No.: 473,167

[22] Filed: Mar. 7, 1983

[51] Int. Cl.³ ............................................. C01B 11/06
[52] U.S. Cl. ...................................................... 423/474
[58] Field of Search ........................................... 423/474

[56] References Cited

U.S. PATENT DOCUMENTS

| | | | |
|---|---|---|---|
| 1,713,669 | 5/1929 | MacMullin et al. | 423/474 |
| 1,718,285 | 6/1929 | George | 423/474 |
| 1,937,230 | 11/1933 | Kitchen | 423/474 |
| 1,937,613 | 12/1933 | Weber | 423/474 |
| 2,320,635 | 6/1943 | Mericola | 423/474 |
| 3,094,380 | 6/1963 | Bruce | 423/474 |
| 3,241,912 | 3/1966 | Nicolaisen | 423/474 |
| 3,760,064 | 9/1973 | Droste | 423/474 |
| 3,895,099 | 7/1975 | Sakowski | 423/474 |
| 4,196,184 | 4/1980 | Sakowski | 423/639 |
| 4,367,209 | 1/1983 | Sakowski et al. | 423/474 |
| 4,399,117 | 8/1983 | Sakowski | 423/474 |
| 4,416,864 | 11/1983 | Wojtowicz | 423/474 |

FOREIGN PATENT DOCUMENTS 54-44280 12/1979 Japan .
55-121901 9/1980 Japan ..................................... 423/474

*Primary Examiner*—Earl C. Thomas

*Attorney, Agent, or Firm*—James B. Haglind; Donald F. Clements

[57] ABSTRACT

Calcium hypochlorite is produced by admixing a slurry of lime containing soluble impurities with a saturated calcium hypochlorite solution in a crystallizing zone. An impure slurry of coarse and small dibasic calcium hypochlorite crystals and fine insolubles in a mother liquor is formed and fed to the intermediate section of a separation zone. An aqueous sodium chloride elutriant is fed to the lower section of the separation zone to separate a slurry of fine insolubles, which is conveyed in the elutriant to the upper section of the separation zone, and small crystals of dibasic calcium hypochlorite, which can be recycled to the crystallizing zone or destroyed by chlorination, from the dibasic calcium hypochlorite solution. A slurry of purified coarse dibasic calcium hypochlorite crystals in the elutriant is removed from the lower section of the separation zone at a rate controlled to maintain a rising velocity in the lower section of the separation zone of from about 0.5 to about 7 centimeters per minute. Purified coarse dibasic calcium hypochlorite crystals are separated from a dibasic hypochlorite mother liquor and admixed with an alkali metal hypochlorite solution to produce a mixed alkali slurry which is chlorinated to form a slurry of calcium hypochlorite dihydrate crystals in a saturated calcium hypochlorite solution which crystals are separated to provide a cake of calcium hypochlorite crystals which is then dried and a saturated solution of calcium hypochlorite which is recycled to the crystallizing zone.

9 Claims, 2 Drawing Figures

CONTINUOUS PROCESS FOR THE MANUFACTURE OF CALCIUM HYPOCHLORITE

This invention relates to the manufacture of calcium hypochlorite. More particularly, this invention relates to an improved continuous process for the manufacture of calcium hypochlorite. Calcium hypochlorite is a commercial bleaching and sanitizing agent used particularly in the disinfection of swimming pools.

Calcium hypochlorite is produced by the reaction of calcium compounds such as an aqueous slurry of lime with a chlorinating agent, for example, chlorine. The chlorination reaction is conducted until crystals of a hypochlorite product such as neutral calcium hypochlorite dihydrate are produced in a hypochlorite mother liquor. After separation of the crystalline hypochlorite product, it is necessary to treat the mother liquor to recover the calcium hypochlorite values or to decompose hypochlorite ions before disposal of the solution.

In U.S. Pat. No. 3,895,099, issued July 15, 1975, to W. J. Sakowski, after removal of the calcium hypochlorite dihydrate crystals, the mother liquor remaining is treated with an alkali metal hydroxide to recover a lime slurry.

The treatment of calcium hypochlorite containing mother liquors with lime to precipitate dibasic calcium hypochlorite crystals is known as described, for example, in U.S. Pat. Nos. 1,713,699; 1,718,285; and 3,094,380.

U.S. Pat. No. 1,713,669, issued to R. B. MacMullin et al., describes a process in which a lime slurry is chlorinated to precipitate calcium hypochlorite which is separated from a filtrate containing hypochlorite values. The filtrate is treated with lime to precipitate basic calcium hypochlorite which is recycled to make up additional lime slurry.

U.S. Pat. No. 1,718,285, issued to A. George, teaches a process for blending a sodium hypochlorite solution and lime and chlorinating the blend to produce neutral calcium hypochlorite crystals in a mother liquor. Following the separation of the crystalline product, the mother liquor may be treated with lime to form a basic hypochlorite which can be used to replace an equivalent amount of lime in the next cycle of the process.

Similarly, U.S. Pat. No. 3,094,380, issued to E. A. Bruce, describes the reaction of calcium hypochlorite mother liquor with lime to crystallize dibasic calcium hypochlorite. A cake of dibasic calcium hypochlorite was recovered and chlorinated to produce neutral calcium hypochlorite.

The processes of U.S. Pat. Nos. 1,713,669; 1,718,285; and 3,094,380 cannot use low grade lime sources as the calcium hypochlorite products produced contain any insoluble impurities originally present in the lime.

In addition, these processes attempt to minimize the amount of calcium hypochlorite liquor recovered from the calcium hypochlorite dihydrate separation and there is not a sufficient amount of this liquor to allow all of the lime used in the process to be converted to dibasic calcium hypochlorite crystals.

The removal of iron from slurries of basic calcium hypochlorite crystals is described in U.S. Pat. No. 3,760,064, issued Sept. 18, 1973, to T. C. Droste, in a process which adds a salt of a metal of Group IIA, IIB, or silver to the slurry to form an insoluble iron compound. The insoluble iron compound is removed from the basic calcium hypochlorite crystals by employing a settling apparatus which provides a differential rate of settling. However, by converting a soluble iron impurity in the slurry to an insoluble impurity, this process introduces additional solids to be separated from the calcium hypochlorite crystals. In addition, inclusion of the metals employed into the finished calcium hypochlorite product is undesirable.

In U.S. Pat. No. 3,895,099, issued July 15, 1975, to W. J. Sakowski, a process is described in which lower grade lime sources may be employed which are initially reacted with chlorine to form a slurry of the insoluble impurities in a solution of calcium hypochlorite and calcium chloride. The insoluble impurities are removed from the solution, for example, by filtering and the purified filtrate is then employed in producing calcium hypochlorite. U.S. Pat. No. 3,895,099 also teaches the treatment of dilute calcium hypochlorite solutions with an alkali metal hydroxide to recover a highly pure lime.

U.S. Pat. No. 4,196,184, issued Apr. 1, 1980, to W. J. Sakowski, describes a process in which a $Ca(OCl)_2$-containing mother liquor is reacted with an alkali metal hydroxide at a pH in the range of 12.1 to 12.6 to form a mixture of crystalline hemi-basic calcium hypochlorite and lime.

While the processes of U.S. Pat. No. 3,895,099 and U.S. Pat. No. 4,196,184 recover calcium vlaues from calcium hypochlorite-containing liquors; both processes require evaporation of the filtrate remaining after separation of the lime.

Japanese Patent Disclosure No. 121,901-1980 publicly disclosed on Sept. 19, 1980, by T. Murakami et al describe a method of removing insoluble impurities from slurries of calcium hypochlorite dihydrate in a classifier tank. As there is a considerable overlap between the particle size of the insoluble impurities and the calcium hypochlorite dihydrate crystals, efficient separation of the insoluble impurities by particle size classification methods is difficult to achieve.

U.S. Pat. No. 4,367,209, issued Jan. 4, 1983, to W. J. Sakowski and B. L. Duncan describes a process for producing calcium hypochlorite in which lime containing insoluble impurities is chlorinated to form a slurry of dibasic calcium hypochlorite crystals and insoluble impurities in a calcium chloride mother liquor. The insoluble impurities are removed from the slurry of dibasic calcium hypochlorite crystals and the dibasic calcium hypochlorite crystals are separated from a calcium chloride mother liquor. The dibasic calcium hypochlorite crystals are admixed with an alkali metal hypochlorite and recycle dibasic calcium hypochlorite crystals in a mixing zone and the mixture chlorinated to produce a calcium hypochlorite dihydrate paste. Following the separation of a cake of calcium hypochlorite dihydrate from a paste liquor, the cake is dried to produce granular calcium hypochlorite. The paste liquor is reacted with lime to form a slurry of dibasic calcium hypochlorite crystals in a sodium chloride-calcium hypochlorite mother liquor. Following separation of the dibasic crystals from the sodium chloride-calcium hypochlorite mother liquor, the dibasic crystals are recycled to the mixing zone.

While the above process can employ low purity limes as the insoluble impurities are removed from the product, the process generates both a calcium chloride mother liquor and a sodium chloride-calcium hypochlorite mother liquor which require disposition. In addition, small crystals of dibasic calcium hypochlorite produced in the crystallizer are admixed with the insoluble impurities and the control of nucleation and the recovery of available chlorine values from these crystals is less than desired.

Thus there is need for a process for producing calcium hypochlorite in which highly pure crystals are produced from low grade lime sources.

It is a primary object of the present invention to provide a continuous process for producing calcium hypochlorite in which low grade lime sources can be used.

An additional object of the present invention is to provide a process for efficiently removing and separately recovering insoluble impurities and small crystals of calcium hypochlorite from coarse calcium hypochlorite crystals.

A further object of the present invention is to provide a process which produces sufficient amounts of paste liquor to react with all of the lime used to produce dibasic calcium hypochlorite crystals.

Another object of the present invention is to provide a continuous process for producing calcium hypochlorite having reduced requirements for waste disposal.

These and other objects of the present invention are accomplished in a continuous process for producing calcium hypochlorite which comprises:

(a) admixing a slurry of lime containing insoluble impurities with a saturated calcium hypochlorite solution in a crystallizing zone to form an impure slurry of coarse dibasic calcium hypochlorite crystals, small crystals of dibasic calcium hypochlorite, and fine insolubles comprised of unreacted lime particles and fine insolubles in a mother liquor;

(b) feeding the slurry to the intermediate section of a separation zone;

(c) feeding an aqueous sodium chloride elutriant to the lower section of the separation zone to contact the slurry and to separate a slurry of fine insolubles and small crystals of dibasic calcium hypochlorite in the elutriant whereby purified coarse dibasic calcium hypochlorite crystals are obtained;

(d) separating the small crystals of dibasic crystals from the fine insolubles in the intermediate section of the separation zone;

(e) conveying the slurry of fine insolubles in the elutriant to the upper section of the separation zone;

(f) removing a slurry of the purified coarse dibasic calcium hypochlorite crystals in elutriant from the lower section of the separation zone, the rate of removal of the purified coarse crystals of dibasic calcium hypochlorite being controlled to maintain a rising velocity in the lower section of the separation zone of from about 0.5 to about 7 centimeters per minute;

(g) separating purified coarse dibasic calcium hypochlorite crystals from a dibasic calcium hypochlorite mother liquor;

(h) admixing a chlorinated caustic solution with the purified coarse dibasic calcium hypochlorite crystals to produce a mixed alkali slurry;

(i) chlorinating the mixed alkali slurry to form a slurry of calcium hypochlorite dihydrate crystals in a saturated calcium hypochlorite solution;

(j) separating the slurry of calcium hypochorite dihydrate crystals to provide a cake of calcium hypochlorite dihydrate crystals and a saturated calcium hypochlorite solution;

(k) drying the cake of calcium hypochlorite dihydrate crystals to produce granular calcium hypochlorite; and (l) recycling the saturated calcium hypochlorite solution to the crystallizing zone.

In the process of this invention, alkali metal hypochlorites, alkali metal hydroxides, and lime are employed as reactants to produce calcium hypochlorite and an alkali metal chloride. In order to simplify the disclosure, the invention will be described hereinafter in terms of "sodium hypochlorite", "sodium hydroxide" and "sodium chloride". However, those skilled in the art will recognize that any other suitable alkali metal hypochlorite such as potassium hypochlorite or any other suitable alkali metal hydroxide such as potassium hydroxide can serve as a substitute or partial replacement for the corresponding sodium compounds. In this event, one of the products will be potassium chloride. In order to simplify process conditions, it is preferred to employ either all sodium compounds or all potassium compounds. However, the process can also be operated with a mixture of these alkali metal compounds if the efficiency of separating products is not important to the operation.

Figure 1:
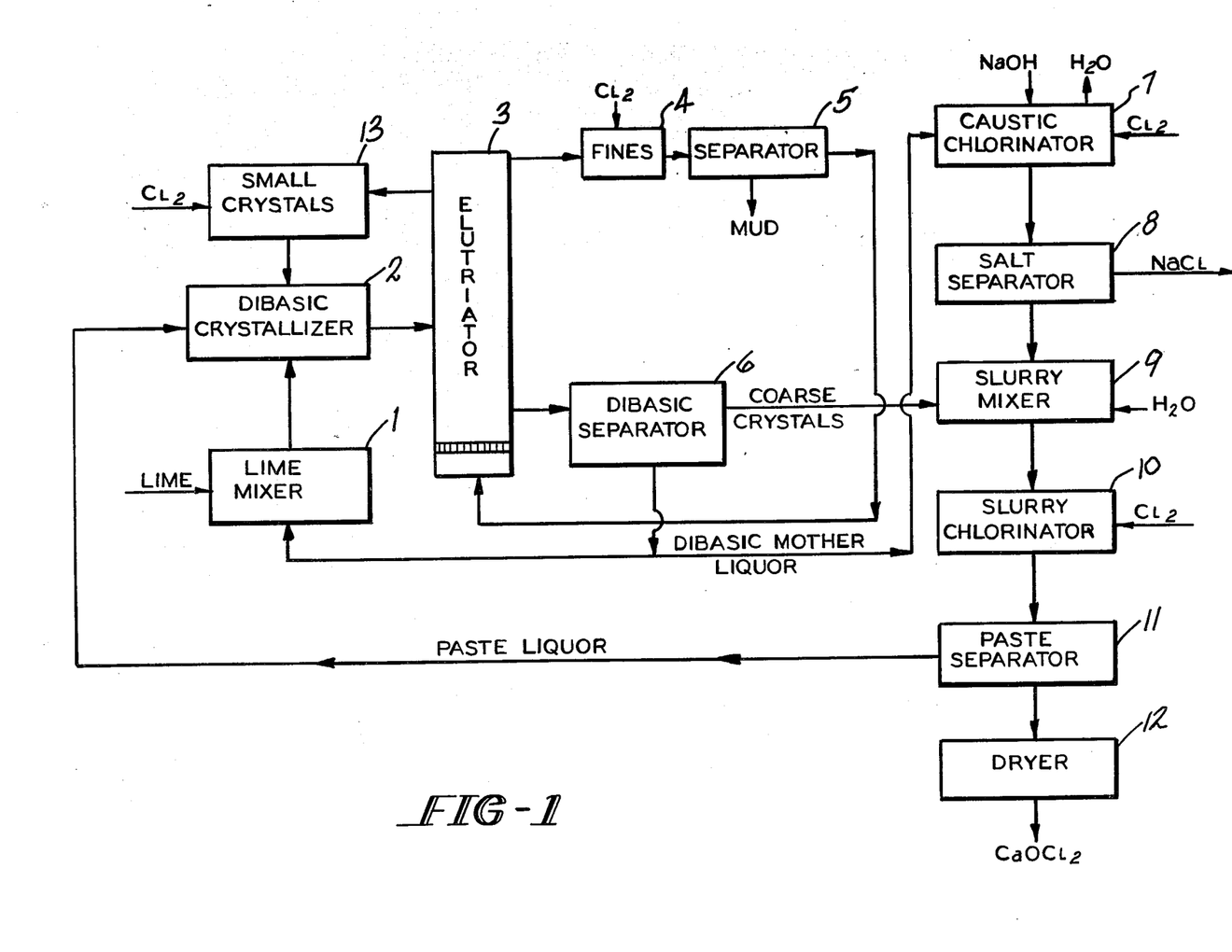
FIG. 1 is a flow sheet of the novel process of the present invention.

More in detail, in the process of FIG. 1, lime and recycle dibasic calcium hypochlorite mother liquor are admixed in lime mixer 1 to form a mixing zone slurry. Lime mixer 1 is a mixing tank or other suitable vessel having agitation means for blending the various components fed thereto.

The resulting mixing zone slurry is conveyed to dibasic crystallizer 2 where it is reacted with paste liquor recovered from calcium hypochlorite paste separator 11 to form a slurry of dibasic calcium hypochlorite crystals in a dibasic mother liquor. "Paste liquor" (or "paste filtrate" when paste separator 11 is a filter) is an aqueous solution which contains sodium chloride and dissolved calcium hypochlorite. Paste liquor generally has a sodium chloride concentration ranging from about 15 to about 22 percent, and preferably from about 17 to about 20 percent by weight, a calcium hypochlorite concentration ranging from about 7 to about 15 percent and preferably from about 8 to about 12 percent by weight, and a water content ranging from about 60 to about 75 percent and preferably from about 68 to about 73 percent by weight. Dibasic crystallizer 2 is any suitable tank crystallizer provided with agitation means.

The lime in the mixing zone slurry reacts with calcium hypochlorite present in the paste liquor to form dibasic calcium hypochlorite in accordance with Equation (1):

$$Ca(OCl)_2 + 2Ca(OH)_2 \rightarrow Ca(OCl)_2 \cdot 2Ca(OH)_2 \qquad (1)$$

This reaction in dibasic crystallizer 2 forms a slurry of dibasic calcium hypochlorite crystals in a dibasic mother liquor, an aqueous solution of sodium chloride and calcium hypochlorite. Dibasic crystallizer 2 is operated at high temperatures and long residence times to produce coarse dibasic calcium hypochlorite crystals. The crystallizer is operated at temperatures in the range of from about 35° to about 50°, and preferably from about 38° to about 43° C.; and with residence times of from about 1 to about 4 hours and preferably from about 1.5 to about 2.5 hours. Dibasic calcium hypochlorite slurry produced contains a large weight fraction of crystals in the size range of from about 100 to about 1000, and preferably from about 400 to about 600 microns. The resulting slurry also contains a small percentage (on a weight basis) of small dibasic calcium hypochlorite crystals and fine insoluble particles of unreacted lime and insoluble impurities. From dibasic crystallizer 2, the slurry of dibasic calcium hypochlorite crystals and fines are fed to an elutriator.

The elutriator may be any suitable vessel having inlets for feeding the elutriant and dibasic calcium hypochlorite slurry to the elutriator and outlets for removing the slurry of clean dibasic calcium hypochlorite crystals, fine particles slurry and small crystals slurry from the elutriator.

Suitable elutriators include a flow distributor plate for the elutriant stream to maintain uniform flow distribution in the lower fluidized bed section of the elutriator in which separation of fine particles occurs; an underflow nozzle for removal of the purified crystal slurry, a fluidized bed, an intermediate growth zone section into which the feed slurry is introduced and from which small dibasic crystals are removed; agitation means in the intermediate section; and an upper sedimentation section wherein most of the small crystals of dibasic calcium hypochlorite are separated from the fine impurities.

Figure 2:
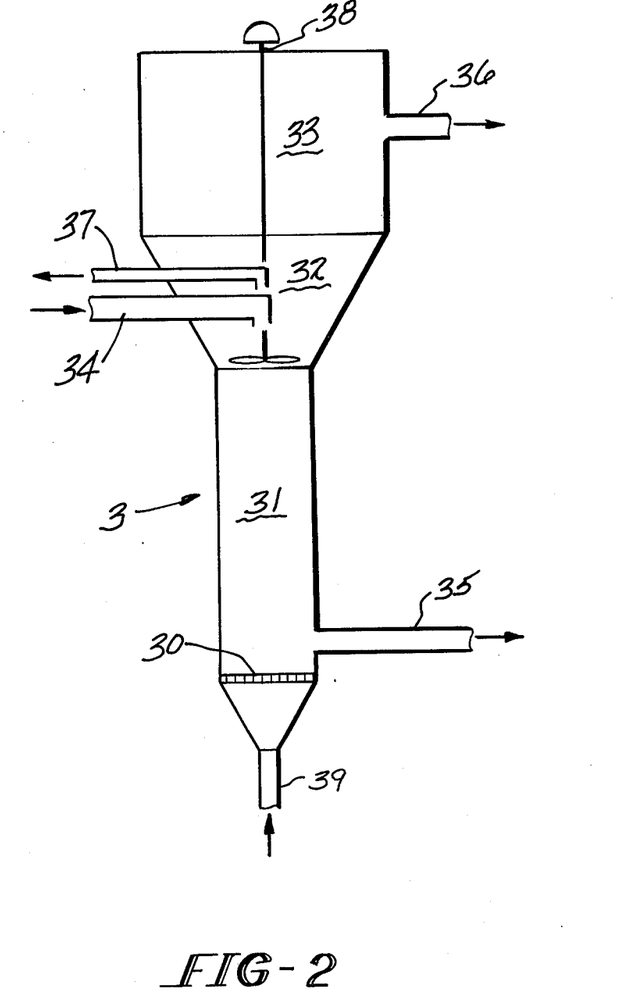
FIG. 2 is a schematic view of one embodiment of the elutriator employed in the process of the present invention.

While the elutriator may be a unidimensional column, in a preferred embodiment, illustrated in FIG. 2, elutriator 3 has an upper section 33 having a larger diameter than that of intermediate section 32 or lower section 31.

A sodium chloride liquor containing less than about 5 percent and preferably less than about 3.5 percent by weight of calcium hypochlorite is fed to lower section 31 of elutriator 3 as the elutriant. The elutriant passes up through plate 30 into lower section 31 and contacts the slurry of dibasic calcium hypochlorite and fine insoluble particles.

The slurry of dibasic calcium hypochlorite crystals fed into intermediate section 32 through inlet 34 contains, in addition to the fine particles, small crystals of dibasic calcium hypochlorite having sizes below about 100 and preferably below about 50 microns. Sufficient residence time within intermediate section 32 of elutriator 3 is provided to permit the coarse dibasic calcium hypochlorite crystals in the intermediate section to reach chemical equilibrium. Intermediate section 32 contains agitation means 38 which operates at very low rates of revolution to prevent channeling in the area just above lower zone 31.

All or a portion of these small crystals are removed from intermediate section 32 of the elutriator through outlet 37 as a slurry in the elutriant. In one embodiment, the slurry of small crystals is returned to dibasic crystallizer 2. In a second embodiment, the slurry is conveyed to small crystals chlorinator 13 and chlorinated to produce additional calcium hypochlorite solution. The calcium hypochlorite solution produced in small crystals chlorinator 13 is fed to dibasic crystallizer 2 to react with the lime slurry. If desired, a portion of the slurry of small crystals may be fed to dibasic crystallizer 2 and a portion of the slurry chlorinated in small crystals chlorinator 13. By this means, small dibasic calcium hypochlorite crystals, suitable as nucleating agents, are recycled or destroyed.

Clean coarse dibasic calcium hypochlorite crystals are removed from lower section 31 of the elutriator 3. To maintain the dibasic calcium hypochlorite crystals in a fluidized state in lower section 31 of the elutriator 3 while effectively removing insoluble impurities and other fine particles from the crystals, the volumetric feed rate of the elutriant into elutriant inlet 39 is maintained slightly greater than the removal rate of clean dibasic calcium hypochlorite crystals through outlet 35. The volumetric feed rate and the crystal removal rate are controlled to maintain a rising velocity in lower section 31 of from about 0.5 to about 7, preferably from about 0.5 to about 4, and more preferably from about 0.5 to about 1.0 cms/min. Operating within these rising velocities, at least 50 percent and up to about 90 percent of the fine particles present in the slurry are removed.

The fine particles, including the insoluble impurities and unbound or unreacted lime particles are conveyed by the elutriant into upper section 33 of elutriator 3 and have particle sizes in the range of from about 0.1 to about 1 micron.

A slurry of fine particles in the elutriant is removed from upper section 33 through outlet 36 and conveyed to fines separator 5. Fines separator 5 removes fine insolubles from the elutriant and these insolubles may be discarded as waste. In a preferred embodiment, prior to separation of insoluble impurities, the slurry of fine insoluble particles is first fed to fines chlorinator 4. Sufficient chlorine is added to fines chlorinator 4 to react with unreacted lime particles present to form calcium hypochlorite and calcium chloride in concentrations sufficiently low to be dissolved in the sodium chloride elutriant. A slurry of fine insoluble impurities in the sodium chloride liquor is removed from fines chlorinator 4. The residual lime in the slurry of fine insoluble particles should be maintained at a low concentration to minimize the lime values lost in fines separator 5 or the amount of calcium hypochlorite formed in chlorinator 4. It is necessary to maintain the $Ca(OCl)_2$ concentration of the sodium chloride liquor below about 5 percent to minimize chemical reactions occurring in elutriator 3. The insoluble impurities recovered from fines separator 5 are discarded as waste. The sodium chloride liquor is returned to lower section 31 of elutriator 3 as the elutriant.

To maintain desirable rising velocities through upper section 33 of elutriator 3 while maintaining higher feed rates of the crystal slurry from dibasic crystallizer 2 to intermediate section 32 of elutriator 3, the ratio of the withdrawal rate of the small crystals slurry through outlet 37 to the slurry feed rates through inlet 34 is carefully controlled. Suitable rising velocities in the upper section are from about 0.2 to about 0.8 and preferably from about 0.3 to about 0.5 cms/min.

Clean coarse dibasic calcium hypochlorite crystals recovered from elutriator 3 are pumped as a slurry in mother liquor to dibasic separator 6. Dibasic separator 6 is any suitable liquid-solid separator which allows the coarse dibasic crystals to be separated from the mother liquor and any insoluble fine particles in the mother liquor. Preferred as dibasic separator 6 is a screen bowl centrifuge or a rotary filter. Dibasic mother liquor is a sodium chloride solution containing less than 5 percent by weight, and preferably less than about 3.5 percent by weight of dissolved calcium hypochlorite. A first portion of the dibasic mother liquor recovered is recycled to lime mixer 1 as the liquid in which the lime is slurried. A second portion of the dibasic mother liquor is fed to caustic chlorinator 7. The cake or concentrated slurry of clean coarse dibasic calcium hypochlorite crystals recovered in dibasic separator is conveyed to slurry mixer 9.

Sodium hypochlorite used in the process of the present invention is prepared by chlorinating an aqueous solution of sodium hydroxide blended with dibasic mother liquor in a suitable agitated caustic chlorinator 7. The sodium hydroxide concentration in the aqueous solution used to make sodium hypochlorite for feed to slurry mixer 9 ranges from about 20 to about 75 and preferably from about 35 to about 55 percent by weight. Caustic chlorinator 7 is preferably an evaporatively cooled chlorinator which removes excess water from the system so that any sodium chloride in excess of that retained in the calcium hypochlorite dihydrate cake is crystallized and recovered. In the presence of dibasic mother liquor, the solubility of sodium chloride is suppressed and solid sodium chloride, formed during the chlorination reaction, is readily precipitated. The slurry of solid sodium chloride in the chlorinated caustic solution is conveyed to salt separator 8. Salt separator 8 may be any suitable solid-liquid separating apparatus such as a centrifuge, filter, and the like. In salt separator 8, solid salt is removed and an aqueous chlorinated caustic filtrate solution having from about 10 to about 18 percent by weight of NaOCl, 2–3% calcium hypochlorite and a soluble sodium chloride concentration of from about 15 to about 25 percent, is recovered and fed to slurry mixer 9.

Coarse dibasic calcium hypochlorite crystals from dibasic separator 6, as a moist cake or concentrated slurry in a dibasic mother liquor, are also fed to slurry mixer 9. The mixed alkali slurry prepared in slurry mixer 9, has a lime concentration of from about 5 to about 12 percent by weight, a calcium hypochlorite concentration of from about 7 to about 12 percent by weight and a sodium hypochlorite content of from about 5 to about 10 percent by weight. Slurry mixer 9 is a mixing tank or other suitable vessel having agitation means for blending the various components fed thereto.

The ultimate water content in the mixed alkali slurry is controlled by the addition of sufficient water to insure that no sodium chloride crystals are formed in slurry chlorinator 10.

The resulting mixed alkali slurry is conveyed to slurry chlorinator 10 and reacted with chlorine. Slurry chlorinator 10 is any suitable chlorination apparatus provided with agitation means for maximum contact between chlorine and slurry. It is preferred to employ as slurry chlorinator 10 an evaporator chlorinator which utilizes the chlorination technique described in U.S. Pat. No. 3,241,912, issued to Bernard H. Nicolaisen on Mar. 22, 1966. The temperature within slurry chlorinator 7 is maintained within the range from about 0° to about 35°, and preferably from about 20° to about 30° C.

Slurry chlorinator 10, at start-up, is preferably filled with a slurry of calcium hypochlorite solids suspended in an aqueous solution of sodium chloride. The residual lime or other alkali in the slurry is maintained below about 1.0, and preferably less than about 0.5 percent by weight of the slurry. The feed rate of mixed alkali slurry and chlorine to slurry chlorinator 10 and the withdrawal rate of the resulting calcium hypochlorite dihydrate paste are adjusted to achieve substantially complete chlorination of the calcium hydroxide values in the mixed alkali slurry while maintaining the total alkali concentration preferably below about 1.0 percent by weight of the slurry.

During chlorination of the mixed alkali slurry in slurry chlorinator 10, the dibasic calcium hypochlorite present reacts with chlorine to form neutral calcium hypochlorite in accordance with Equation (2):

$$Ca(OCl)_2 \cdot 2Ca(OH)_2 + 2Cl_2 \rightarrow 2Ca(OCl)_2 + CaCl_2 + 2H_2O \qquad (2)$$

Sodium hypochlorite present in slurry chlorinator 10 reacts with the calcium chloride formed to produce additional calcium hypochlorite and sodium chloride in accordance with Equation (3):

$$2NaOCl + CaCl_2 \rightarrow Ca(OCl)_2 + 2NaCl \qquad (3)$$

Continuous chlorination of the mixed alkali slurry is preferred as it results in the formation of coarse calcium hypochlorite dihydrate crystals which are much more easily separated from paste liquor in paste separator 11 than are calcium hypochlorite dihydrate crystals separated in a conventional triple salt process or a batch type process.

A portion of the resulting calcium hypochlorite dihydrate paste produced in slurry chlorinator 10 is continuously withdrawn from slurry chlorinator 10 to maintain a level control therein and then conveyed to paste separator 11. The paste is comprised of solid neutral calcium hypochlorite dihydrate in a weight concentration of from about 15 to about 20 percent and a paste liquor. The paste liquor is predominately an aqueous solution of sodium chloride and calcium hypochlorite, as described above.

The paste is designed to have reduced concentrations of calcium hypochlorite dihydrate crystals to generate sufficient paste liquor and provide the calcium hypochlorite necessary to react with all of the lime slurry fed to dibasic crystallizer 2. The concentration of dihydrate crystals in the paste is controlled by the analysis of the chlorinated caustic filtrate, which when blended with the coarse dibasic calcium hypochlorite crystals, gives the desired concentrations of CA(OCl)₂.

Paste separator 11 is a filter, centrifuge, or other suitable solid-liquid separating apparatus capable of separating a moist cake of calcium hypochlorite dihydrate crystals from the aqueous solution of sodium chloride and calcium hypochlorite.

Moist cake from paste separator 11 generally contains from about 40 to about 60 percent by weight of calcium hypochlorite dihydrate, from about 2 to about 15 percent by weight of sodium chloride, and from about 40 to about 50 percent by weight of water. Moist cake is generally conveyed to dryer 12 where it is heated to remove most of the water. Dryer 12 is any suitable drying unit or units capable of reducing the moisture content of the calcium hypochlorite cake to the desired level without causing excessive decomposition of the calcium hypochlorite particles.

Generally the water content of the moist calcium hypochlorite cake is reduced in dryer 12 to below about 10 percent by weight, for example, in the range from about 0.5 to about 10, preferably from about 0.5 to about 8, and more preferably from about 4.0 to about 8 percent by weight. The calcium hypochlorite content of the dried product generally ranges from about 65 to about 85, and preferably from about 65 to about 75 percent by weight. The remainder of the dried product is predominately sodium chloride. The dried calcium hypochlorite product is then placed in suitable containers, with or without prior size classification or other processing such as pelletizing, prior to use, for example, in water treatment.

EXAMPLE

128 Parts of 52% caustic were blended with 5 parts of a recycle stream of wash water from a salt washer and 593 parts of recycled mother liquor separated from a dibasic calcium hypochlorite slurry. This blend was chlorinated in an evaporatively cooled chlorinator wherein 118 parts of water were evaporated. The stream leaving the chlorinator was a sodium chloride slurry in a mother liquor containing 2.9% calcium hypochlorite, 10.1% sodium hypochlorite, and 17.6% sodium chloride. The salt slurry was 9.0% sodium chloride crystals. This slurry was separated to obtain 70 parts of sodium chloride crystals which were washed with 5 parts of water, which was the recycled wash water mentioned above. The 589 parts of filtrate, from the above slurry, containing 10.1 percent of NaOCl and 2.9% Ca(OCl)$_2$, were blended with 210 parts of dibasic calcium hypochlorite filter cake, 133 parts of water and then chlorinated to produce 989 parts of a slurry of calcium hypochlorite dihydrate consisting of 19.4% calcium hypochlorite and 17.3% sodium chloride. This slurry was then separated to obtain 246 parts of a calcium hypochlorite dihydrate filter cake containing 83% available chlorine on a dry basis. This cake was air dried to produce a 72% available chlorine product containing 6.5% water.

The filtrate from the dihydrate slurry was reacted with 62 parts of a 95% active Mississippi lime blended in 156 parts of a recycled dibasic mother liquor. The active lime was reacted with the excess available chlorine in the dihydrate filtrate to form 961 parts of a dibasic calcium hypochlorite crystal slurry in a mother liquor containing 2.9% calcium hypochlorite and 21.5% sodium chloride in solution. The dibasic calcium hypochlorite slurry contained 7.7% by weight of dibasic crystals.

An elutriator of the type described in FIG. 2 was employed to separate the dibasic calcium hypochlorite crystals from the dibasic calcium hypochlorite slurry. This elutriator had a cylindrical fluidized bed section (lower section 31) of about 10 centimeters in diameter and a height of about 35 centimeters. The sedimentation zone (upper section 33) had a diameter of about 65 centimeters and a height of about 15 centimeters. The intermediate section 33 was tapered to join the lower section 31 with the upper section 33 at an angle of about 60°. The height of the intermediate section 32 was about 48 centimeters.

Diabasic calcium hypochlorite slurry containing the original 3.1 parts of fine insoluble impurities, was fed to intermediate section 31 of the elutriator at a rate of 961 parts per minute. Clean, filtered dibasic mother liquor was fed into the lower section 31 through elutriant inlet 39 at a rate of 1121 parts per minute. The elutriated clean dibasic calcium hypochlorite slurry was withdrawn from the bottom of lower section 31 at a rate of 958 parts per minute, filtered to obtain 210 parts of clean dibasic crystal cake which was then blended with the sodium hypochlorite solution mentioned above to prepare the feed slurry mixer 9.

The rising velocity of the elutriant in lower section 31 (fluidized bed) was 2.4 cm/min. This removed the 3.1 parts of fines impurities and carried them to the upper section 33 where the rising velocity was 0.3 cm per minute, too low to allow carry-over of any dibasic crystals. The 1124 parts of the fines impurities slurry overflowing the upper section 33 of the elutriator was so low in free alkali that only a trace of chlorine was required to bring the pH to 9.8. This stream was filtered to remove the fine insolubles and then was returned to the bottom of the elutriator.

The filtrate was recycled to elutriate more impurities from the subsequent dibasic crystal slurry and the impurities cake was discharged as a solid waste. No waste stream requiring disposition was generated.

A small stream of small dibasic crystals was removed from an intermediate section of the elutriator and the crystalline fines were destroyed by chlorination prior to recycling this stream to the dibasic calcium hypochlorite crystallizer.

The novel process of the present invention effectively separates insoluble impurities from the lime employed in the process while generating sufficient calcium hypochlorite paste liquor to react with all of the lime used in the process. Small crystals of dibasic calcium hypochlorite produced in the process are effectively separated and recycled or destroyed. The process operates at reduced costs for raw materials and reduced amounts of stream.

What is claimed is:

1. A continuous process for the production of calcium hypochlorite which comprises:
   (a) admixing a slurry of lime containing insoluble impurities with a saturated calcium hypochlorite solution in a crystallizing zone to form an impure slurry of coarse dibasic calcium hypochlorite small crystals of dibasic calcium hypochlorite and fine insolubles comprised of unreacted lime particles and fine insolubles in a mother liquor;
   (b) feeding said slurry to the intermediate section of a separation zone;
   (c) feeding an aqueous sodium chloride elutriant to the lower section of said separation zone to contact said slurry and to separate a slurry of fine insolubles and small crystals of dibasic calcium hypochlorite in said elutriant whereby purified coarse dibasic calcium hypochlorite crystals are obtained;
   (d) separating said small crystals of dibasic calcium hypochlorite from said fine insolubles in said intermediate section of the separation zone;
   (e) conveying said slurry of fine insolubles in said elutriant to the upper section of said separation zone;
   (f) removing a slurry of said purified coarse dibasic calcium hypochlorite crystals in elutriant from said lower section of said separation zone, the rate of removal of said purified coarse crystals of dibasic calcium hypochlorite being controlled to maintain a rising velocity in the lower section of said separation zone of from about 0.5 to about 7 centimeters per minute;
   (g) separating said purified coarse dibasic calcium hypochlorite crystals from a dibasic calcium hypochlorite mother liquor;
   (h) admixing a chlorinated caustic solution with said purified coarse dibasic calcium hypochlorite cyrstals to produce a mixed alkali slurry;
   (i) chlorinating said mixed alkali slurry to form a slurry of calcium hypochlorite dihydrate crystals in a saturated calcium hypochlorite solution;

(j) separating said slurry of calcium hypochlorite dihydrate crystals to provide a cake of calcium hypochlorite dihydrate crystals and a saturated calcium hypochlorite solution;

(k) drying said cake of calcium hypochlorite dihydrate crystals to produce granular calcium hypochlorite; and (i) recycling said saturated calcium hypochlorite solution to said crystallizing zone.

2. The process of claim 1 in which the rate of removal of said slurry of small crystals and the rate of removal of said slurry of fine insolubles are controlled to maintain a rising velocity in the upper section of said separation zone of from about 0.2 to about 0.8 centimeters per minute.

3. The process of claim 2 in which said slurry of small crystals is introduced into said crystallizing zone.

4. The process of claim 2 in which said slurry of small crystals is chlorinated to form a calcium hypochlorite solution which is introduced into said crystallizing zone.

5. The process of claim 1 in which said unreacted lime particles in said slurry of fine insolubles are chlorinated to form a slurry of fine insolubles in said sodium chloride elutriant.

6. The process of claim 2 in which a portion of said dibasic calcium hypochlorite mother liquor is admixed with said lime to form said lime slurry.

7. The process of claim 2 in which a portion of said dibasic calcium hypochlorite mother liquor is admixed with an alkali metal hydroxide and said mixture reacted with chlorine to form a slurry of sodium chloride crystals in a chlorinated caustic solution.

8. The process of claim 7 in which said sodium chloride crystals are separated from a chlorinated caustic solution.

9. A process for the production of diabasic calcium hypochlorite which comprises:

(a) admixing a slurry of lime containing insoluble impurities with a saturated calcium hypochlorite solution in a crystallizing zone to form a slurry of coarse impure dibasic calcium hypochlorite crystals, small crystals of dibasic calcium hypochlorite and fine insolubles comprised of unreacted lime particles and fine insolubles in a mother liquor;

(b) feeding said slurry to the intermediate section of a separation zone;

(c) feeding an agueous sodium chloride elutriant to the lower section of the separation zone to contact said slurry and to separate a slurry of fine insolubles and small crystals of dibasic calcium hypochlorite in said elutriant whereby purified coarse dibasic calcium hypochlorite crystals are obtained;

(d) separating said small crystals of dibasic calcium hypochlorite from said fine insolubles in said intermediate section of the separation zone;

(e) conveying said slurry of fine insolubles in said elutriant to the upper section of said separation zone;

(f) removing a slurry of small crystals of dibasic calcium hypochlorite in said elutriant from said intermediate section of the separation zone at a point above the point of feeding said slurry;

(g) removing a slurry of said purified coarse dibasic calcium hypochlorite crystals in said elutriant from the lower section of the separation zone, the rate of removal of said purified coarse crystals of dibasic calcium hypochlorite being controlled to maintain a rising velocity in said lower section of said separation zone of from about 0.5 to about 7 centimeters per minute; and (h) removing said slurry of fine insolubles in said elutriant from the upper section of said separation zone and recycling said elutriant to said lower section of said separation zone.

* * * * *

UNITED STATES PATENT AND TRADEMARK OFFICE
CERTIFICATE OF CORRECTION

PATENT NO. : 4,468,377
DATED : August 28, 1984
INVENTOR(S) : Walter J. Sakowski et al It is certified that error appears in the above-identified patent and that said Letters Patent is hereby corrected as shown below:

Column 1, line 30, delete "1,713,699" and insert --1,713,669--.

Column 2, line 27, after "calcium" delete "vlaues" and insert --values--.

Column 8, line 43, after "of" delete "CA(OCl)$_2$" and insert --Ca(OCl)$_2$--.

Column 11, line 8, delete "(i)" and insert --(1)--.

Column 12, line 10, after "an" delete "agueous" and insert --aqueous--.

Signed and Sealed this

Twenty-sixth Day of March 1985

[SEAL]

Attest:

DONALD J. QUIGG

*Attesting Officer*   *Acting Commissioner of Patents and Trademarks*

UNITED STATES PATENT AND TRADEMARK OFFICE
CERTIFICATE OF CORRECTION

PATENT NO. : 4,468,377
DATED : August 28, 1984
INVENTOR(S) : Walter J. Sakowski, et al It is certified that error appears in the above-identified patent and that said Letters Patent is hereby corrected as shown below:

On the title page, [75], line 2, delete "Manohar" and insert --Manoharlal--.

Column 8, line 5, after "neutral" delete "calcum" and insert --calcium--.

Signed and Sealed this

Thirtieth Day of April 1985

[SEAL]

Attest:

DONALD J. QUIGG

Attesting Officer     Acting Commissioner of Patents and Trademarks